(12) United States Patent
Markley et al.

(10) Patent No.: US 8,764,098 B2
(45) Date of Patent: Jul. 1, 2014

(54) PORTABLE GOLF CART COVER

(76) Inventors: John Keith Markley, Viera, FL (US); Paul Michael Bartlett, Melbourne, FL (US)

( * ) Notice: Subject to any disclaimer, the term of this patent is extended or adjusted under 35 U.S.C. 154(b) by 0 days.

(21) Appl. No.: 13/592,099

(22) Filed: Aug. 22, 2012

(65) Prior Publication Data
US 2014/0054921 A1 Feb. 27, 2014

(51) Int. Cl.
B60J 7/20 (2006.01)

(52) U.S. Cl.
USPC .................................. 296/136.07; 296/136.1

(58) Field of Classification Search
USPC ......................................... 296/136.07, 136.1
See application file for complete search history.

(56) References Cited

U.S. PATENT DOCUMENTS

| | | | |
|---|---|---|---|
| 3,709,553 A | 1/1973 | Churchill et al. | |
| 4,013,315 A * | 3/1977 | West | 296/83 |
| 4,098,536 A | 7/1978 | Mills | |
| 4,799,728 A * | 1/1989 | Akers et al. | 296/136.04 |
| 5,161,849 A | 11/1992 | Holland, Jr. | |
| 5,217,275 A | 6/1993 | Ridge | |
| 5,259,656 A | 11/1993 | Carroll | |
| 5,388,881 A * | 2/1995 | Spencer et al. | 296/77.1 |
| 5,788,317 A * | 8/1998 | Nation | 296/141 |
| 5,915,399 A | 6/1999 | Yang | |
| 6,709,043 B2 | 3/2004 | Beusse et al. | |
| 6,916,059 B2 | 7/2005 | Feinberg | |
| 6,926,334 B1 | 8/2005 | Diehm | |
| 7,740,300 B2 | 6/2010 | Marsh et al. | |

OTHER PUBLICATIONS www.overstock.com, "All Season" White Golf Cart Cover, Internet Publication, Date Unknown.
www.amazon.com, Tour Trek Driving Golf Cart Cover, Internet Publication, Date unknown.
www.moddells.com, Classic Accessories Deluxe 4-Sided Golf Cart Enclosure, Internet Publication, Date Unknown.
www.golf-aid.com, Golf Cart Enclosure by GolfShield, Internet Publication, Date Unknown.
www.golfshield.com, Internet Publication, Date Unknown.
www.innovagolf.com, Universal Golf Cart Winter Enclosure Cover, Internet Publication, Date Unknown.
www.shadys.com, Internet Publication, Date Unknown.
Office Action dated Dec. 12, 2012, U.S. Appl. 13/365,149, John Keith Markley.

* cited by examiner

*Primary Examiner* — Joseph Pape
*Assistant Examiner* — Dana Ivey
(74) *Attorney, Agent, or Firm* — Stephen C. Thomas (57) ABSTRACT

An improved portable golf cart cover made from lightweight material enabling the cart cover to fit within a small storage bag that may conveniently be hung from a user's golf bag or stowed within one of its pockets. The cart cover may weigh 1.5 pounds or less and fit within a cylindrical storage bag. The cart cover may be fabricated from polyvinylchloride (PVC) film material or polyethylene (PE) material. The cart cover seams may be heat bonded, chemically bonded or attached by other means known in the art. The cart cover may be of such low cost that it could be termed disposable. Attachments may releasably secure the cart cover to the upper rear frame and wheel well structures of the golf cart. The cart cover may include provisions for advertising on the non-transparent surfaces thereof.

6 Claims, 7 Drawing Sheets

Fig. 1

(Prior Art)

PORTABLE GOLF CART COVER

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to golf cart accessories, more specifically, the present invention relates to portable golf cart covers which are small and lightweight enough for a golfer to carry in a golf club bag, or attached to a golf club bag, and which fit a plurality of golf cart models of differing manufacture, size and shape.

2. Background

Golf has become a year-round sport which is played in numerous countries throughout the world. Because of the popularity of the sport, the length of time required to play, and other factors it is often necessary to reserve course time at least several days in advance. Moreover, as in any sport, the players generally prefer to set aside a particular time during the week, or even during the month, for the activity. Thus, it is often the case that golfers will play in less than ideal weather conditions rather than reschedule their game.

Figure 1:
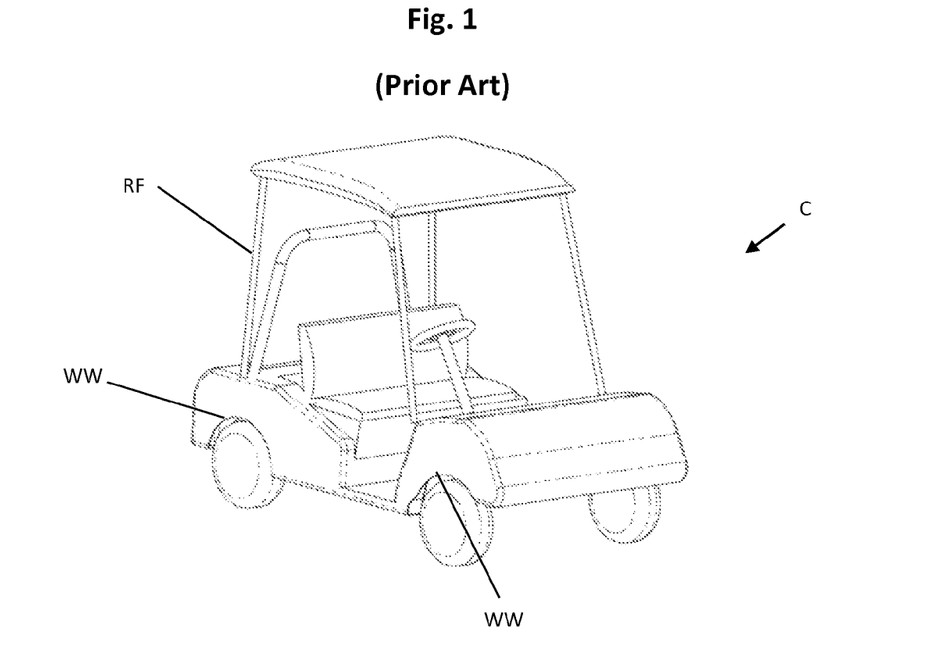
FIG. 1 depicts a top perspective view of a conventional golf cart.
Figure 2:
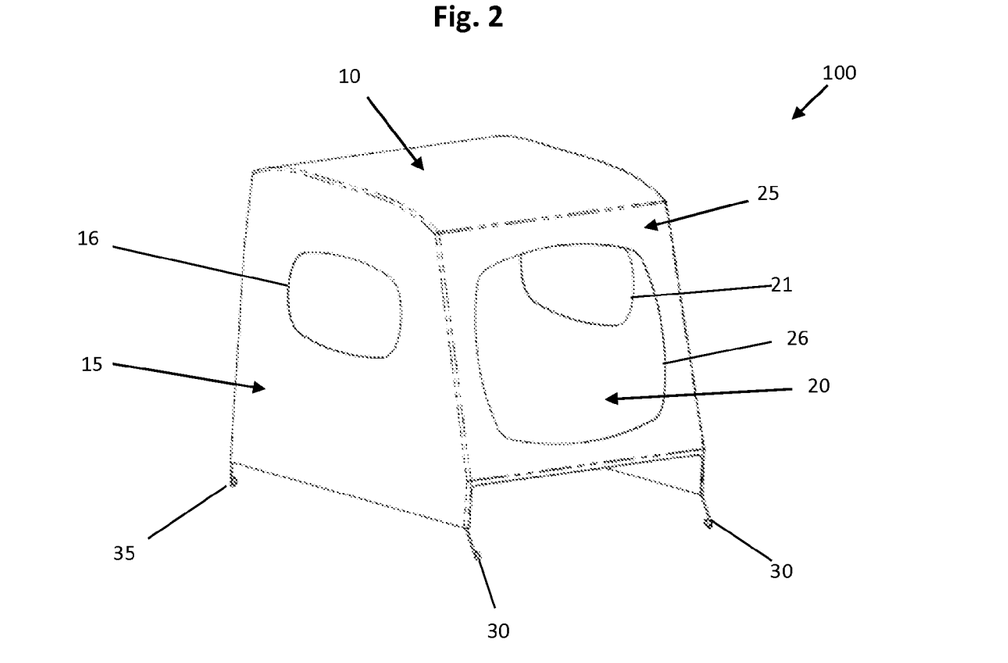
FIG. 2 depicts a front, top perspective view of one embodiment of a portable golf cart cover of the present invention.
Figure 3:
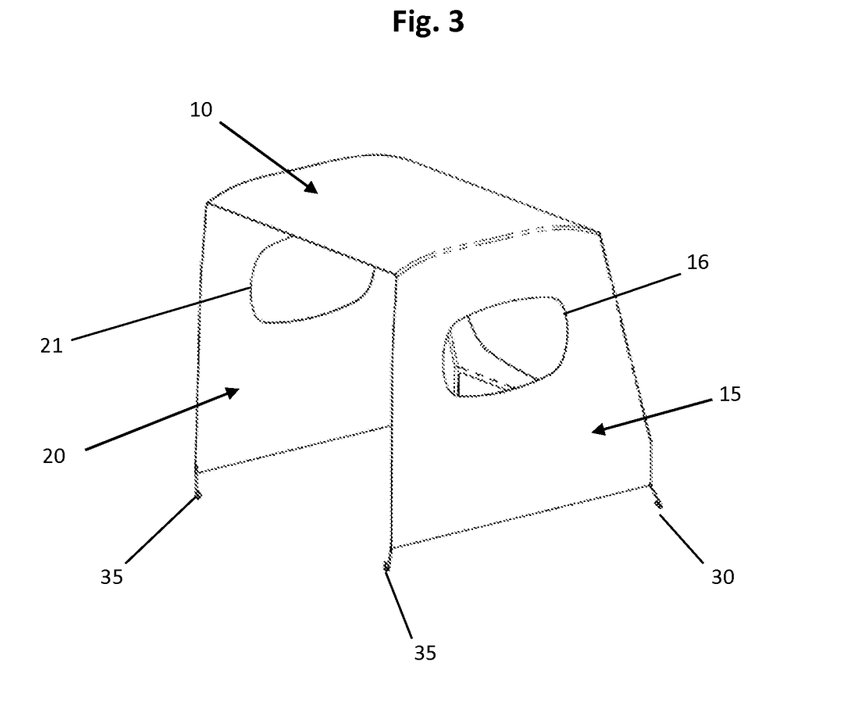
FIG. 3 depicts a rear, top perspective view of one embodiment of a portable golf cart cover of the present invention.
Figure 4:
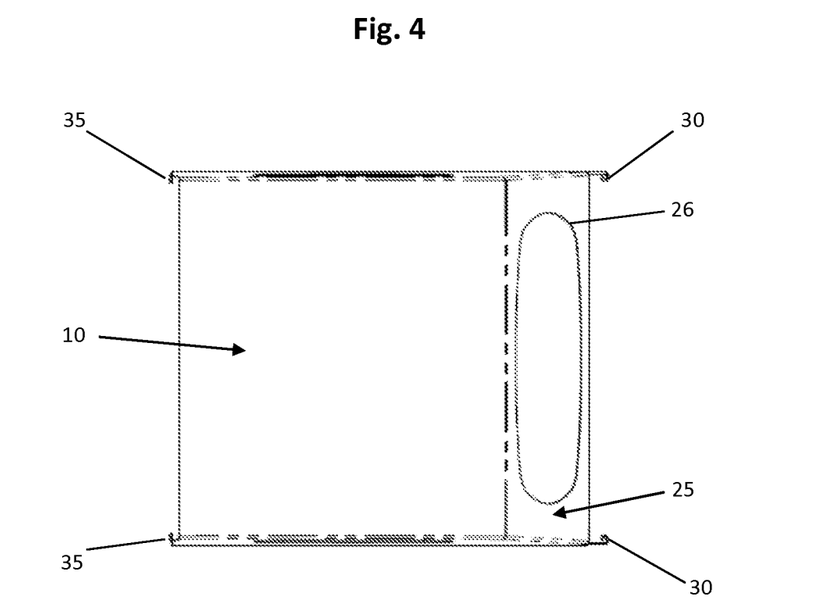
FIG. 4 depicts a top planar view of a portable golf cart cover of the present invention.
Figure 5:
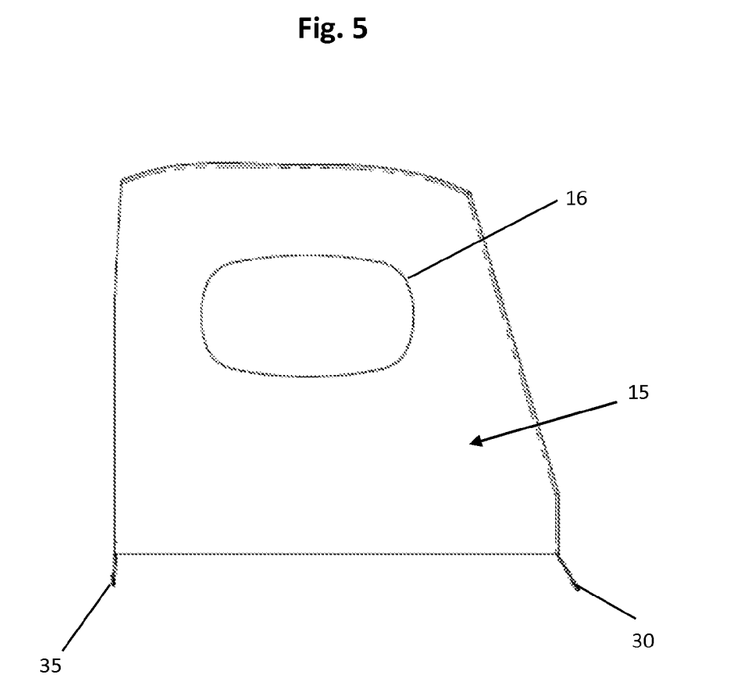
FIG. 5 depicts a right side view of a portable golf cart cover of the present invention.
Figure 6:
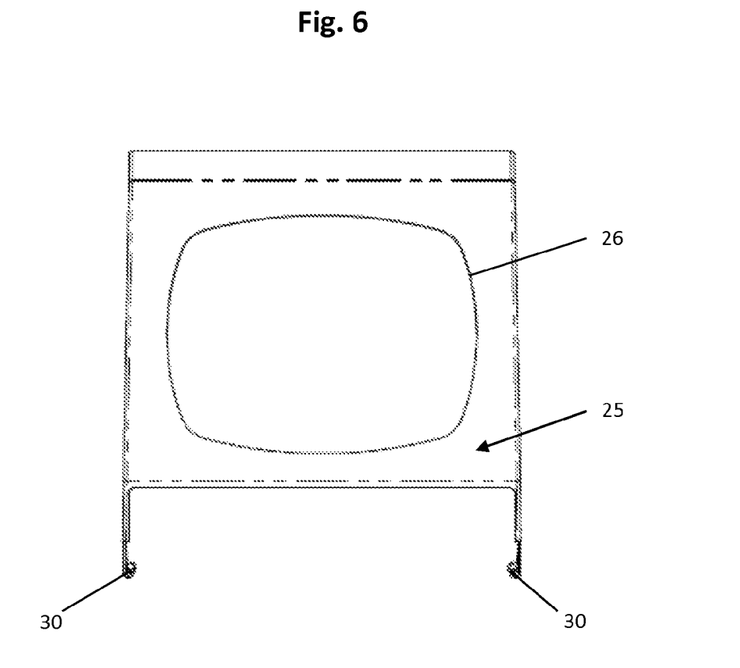
FIG. 6 depicts a front view of a portable golf cart cover of the present invention.

As shown in FIG. 1, conventional powered golf carts C are typically open-sided vehicles having a body and a hard-top roof supported by four support posts mounted to the body. The open sides make it easy for people to get in and out of the cart. The open-sided carts, however, do not provide much protection for occupants against wind, rain, cold, insects, or other adverse conditions. During inclement weather, the roof of a golf cart may provide some protective cover for golfers seated in the cabin section. On a rainy day, however, it is also preferable to use a golf cart cover to shield the cabin section from rain blowing through the open sides, front and/or back of the cart. Various types of portable golf cart covers are commercially available. These covers are typically comprised of several panels of a water-repellant material such as canvas or tarpaulin. A window, made of a transparent plastic material, is typically provided in at least the front panel for purposes of visibility. The panels may be joined to one another and to the windows by sewing or with heavy-duty zippers. These covers are usually attached to the cart by means of hooks and/or clips. Access into and out of the cart is afforded by an opening in at least one of the side walls. Typically, the opening is held closed by means of a heavy-duty zipper or snaps.

Although most of these golf cart covers provide adequate protection from the rain, they have numerous drawbacks. For example, canvas and tarpaulin are relatively heavyweight materials, having a thickness on the order of at least 12 mils, which prohibits folding a cover constructed of this material to a size which is compact and easy to transport and store, and is difficult especially for the golfer to conveniently store in a golf bag. Moreover, folding the cover up and onto the roof when not in use tends to give an unsightly appearance. Because the material is heavyweight, panels must be joined by sewing them together or by sewing in zippers, all of which leads to high manufacturing costs. The stitching may eventually weaken and tear, and zippers often corrode, stick or even break. In addition to being bulky, a canvas or tarpaulin cover weighs an average of 12-15 pounds and can be quite costly to purchase. Canvas or tarpaulin also has a tendency to become discolored from soiling and moldy if not allowed to dry completely before folding. Another drawback of canvas covers is that they typically are comprised of plastic windows which yellow, harden and crack when exposed to ultraviolet radiation from sunlight, again making these covers difficult to fold and unreliable as rain protection, as the plastic windows of the cover may crack and become disassociated from the cover altogether. The canvas covers of the prior art are not portable due mainly to their size, weight and stiffness; do not fit within the pockets of a golf bag; and do not reasonably enable a golfer to provide his own rain protection for a rented cart by carrying his or her own cart cover.

Others have previously attempted to overcome one or more of these drawbacks. U.S. Pat. No. 4,098,536 to Mills, for example, discloses a weathershield for golf carts which, when not in use, may be folded and packed into a pouch for storage. The shield may be constructed of a transparent plastic material. However, the use of a heavy-duty zipper in at least one side wall necessitates the use of a relatively heavyweight material. The shield must be secured at intervals around the outside body of the cart by clamps, hooks, and/or snaps.

U.S. Pat. No. 4,013,315 to West discloses a rain curtain assembly for a golf cart comprised of a plurality of panels which are compressible into a small package when not in use. However, assembly of the curtain tends to be somewhat complex, requiring tie cords for securing the panels and suction cups and hook means to attach the curtain to the golf cart. Moreover, cloth binding must be sewn onto the panels to provide strength and shape.

U.S. Pat. No. 3,709,553 to Churchill discloses a golf cart rain cover that includes a pair of plastic curtains supported at the top by a guide member which is attached to each side of the roof of the golf cart. Each curtain of this prior art device is designed to be compressible into a bundle at one side of the cart when not in use. Such prior art curtain arrangements have been accompanied by various disadvantages, including the necessity for a permanent mounting installation on the cart and the presence of a bulky mass of material at the side of the carts when the curtains are not in use.

Golf cart enclosures today are generally one of two types. One type is installed semi-permanently and remains in place throughout the cold weather season. The second type is portable and loosely shaped to fit most cart manufacturers. The portable enclosures tend to be either over-the-roof models with four sides or under-the-roof models with three sides.

Most portable patented golf cart enclosure products in the market today are four sided and slip over the entire golf cart frame. This process typically requires two people to install and remove for storage and becomes more difficult in high wind conditions. A second patented design has three sides and attaches under the cart roof using straps or rails. This design requires significant installation time and effort to make the necessary connections and is not intended to be portable. A third patented design attaches to the roof front support bars and rear roof support bars and is easily removable after a installing a semi-permanent fitting on the front roof support bars.

Most enclosures use zippered openings that typically have a closed end at the top to ensure the zippers can be reliably opened and closed. This closed end results in a very small opening for ingress and egress which presents difficulty to the golfer entering or exiting the cart. The zippers must accommodate different degrees of tension to accommodate the different sizes and shapes of golf cart models, which affects in zipper performance during closing and opening. Golf cart enclosure zippers are inherently unreliable and generally fail over time due to corrosion, normal wear resulting from use, and other factors. Because zippers are mechanical, they are prone to break, snag and tear. Most portable enclosures when installed can stretch a door side, which adds tension on the zippers and contributes to door zipper failure. The zipper teeth can get out of alignment and fail. Zippers also tend to separate from material over time, due to shrinking, caused by tension, the rotting of stitching and weather factors including ultraviolet degradation of materials. In short, there is a high probability that zippers will jam or fail over time.

Golf carts are typically owned by either the player or by the course operator, who may be, for example, a golf club or a golf course owner. The vast majority of carts in use are owned by the course operator and are rented to players who present for play at the golf course. This means that the vast majority of golf carts in use are rented by players and not owned by players. This situation presents uncertainty to the player, as he or she is generally at the mercy of the golf course operator to provide rain protection for the golf cart because the golf cart covers of the prior art are not enabled to fit inside a golf bag; they are designed to stay with the cart. It is a feature of the current invention, as described further herein, that the invention, by its small size, light weight, quick and simple means for attachment, and other features enables the player to provide his own protection from the elements independent of the golf course operator, golf club or golf course owner by enabling the player to carry his own cart cover conveniently in his golf bag, or attached to the outside of his golf bag, and therefore remove any uncertainty as to whether the player will have protection from the elements while on the course. The cart cover of the present invention therefore is a significant improvement in the art.

Most golf cart enclosures today made from heavyweight material are sold in a large, "portable" storage bag. The functional portability of such products is highly questionable as these storage bags can quite often be large, cumbersome, and heavy thereby limiting their true portability. For instance, a typical canvas cover can, when packaged, be of a size and volume that it is impossible to fit inside a golf club bag, or hang on a golf club bag. Such golf cart covers are intended to be kept with the cart, for instance, placed within a wire basket on the back of the cart, as opposed to being kept by the golfer. This means that, when it comes to rain protection, the golfer must rely upon his good fortune when renting a cart for play: if the rented cart owner, such as the golf club or golf course owner, has provided a cart cover with the cart, the golfer may in fact have some protection from the elements. However, if the cart owner has not provided a cart cover with the cart, the golfer is left with no rain protection except the roof of the cart itself, which is virtually no protection from the elements. And, in any event, the cart covers of the prior art are so heavy, large and cumbersome that, even if provided, may not be deployed in time to protect from the elements. Furthermore, such prior art golf cart covers are comprised of storage bags that often make it difficult to re-fold the enclosure to place it back into its storage bag. As a result, most cart owners may first dispense with using the storage bag and then the enclosure altogether.

A much more desirable approach for rain and inclement weather protection is for the golfer himself to carry a lightweight, portable, easily deployable, cart cover that is small enough to fit in the typical golf club bag and is easily deployable by a single person. In this manner the golfer can be assured that, independent of the cart owner's actions regarding rain protection, the golfer will have adequate rain protection when he needs it.

The types of golf cart covers as described in the prior art are adequate in some respects but in other ways exhibit various significant disadvantages which lead to the result that few, if any, golfing establishments have provided these curtains and covers on their golf carts. Obviously the cart covers are an additional expense which many clubs do not wish to incur. Therefore, when a golfer is playing on a course which does not provide golf carts equipped for inclement weather, that person is subject to being uncomfortable or to an interruption of the game. While a golfer's home course may possibly provide weather-proof carts, it is quite likely that in today's mobile society that same golfer will travel on vacation or for business reasons and play on many courses that do not have such carts. In these situations, it is desirable that the golfer be enabled to provide his own protection from the elements independent of the golf cart owner.

Another problem encountered by conventional cart covers is that golf carts are available in many different models and are manufactured by a variety of companies. Golf carts therefore are not of uniform shape or size. As a result, specific cart covers are designed and sized to fit over specific golf cart models, thereby necessitating cover manufacturers, wholesalers, or retailers to stock multiple different models and sizes of golf cart covers.

Accordingly therefore there is a need for a, lightweight, universal, affordable golf cart cover that, when removed from the cart is packaged in such a way as to fit inside or to hang on the outside of a golf bag; which is suitable for mass production and tailored for use with a majority of golf carts of the same class (e.g., single seat, two-person golf cart); and which can easily be installed by a single person.

BRIEF SUMMARY

In accordance with one embodiment, a portable golf cart cover comprising a roof panel; a right side panel attached to the roof panel; a left side panel attached to the roof panel; a front panel comprising a window fabricated from transparent material attached to each of the roof panel, the right side panel, and the left side panel; one or more lower front attachments capable of releasably securing the golf cart cover to one or more front wheel wells of a golf cart, the one or more lower front attachments are fixed to each of the right side panel and the left side panel; and one or more lower rear attachments capable of releasably securing the golf cart cover to one or more rear wheel wells of the golf cart, the one or more lower rear attachments are fixed to each of the right side panel and the left side panel. The cover of the invention is small enough that, when packaged, fits within a golf club bag and therefore enables the player to provide his own rain protection independently from any protection provided by the golf cart owner. The cover of the invention is lightweight and flexible so that it can be deployed by a single person, and is inexpensive such that the cost of acquisition and/or replacement is minimal. The cover can be offered for sale, for instance, in pro shops or the like, enabling the golfer to purchase a cover before play and to store the cover of the invention in his golf club bag as he travels from course to course. An alternate embodiment of the golf cart cover fabricated from PVC, PE or like material, such as those materials used in the fabrication of disposable rain ponchos, is of such low cost that this embodiment of the invention could be termed disposable.

Additional embodiments may further comprise a storage bag for storing the golf cart cover when not in use, the storage bag comprising a cylindrical shape configuration having a radius of 3 inches or less and a height of 10 inches or less; one or more upper rear attachments capable of releasably securing the golf cart cover to at least one rear frame structure of the golf cart, the one or more upper rear attachments are fixed to each of the right side panel and the left side panel; and/or one or more side panel attachments capable of releasably securing the right side panel or the left side panel in an open configuration allowing access to an interior compartment of the golf cart, the one or more side panel attachments are fixed to each of the right side panel and the left side panel. A yet further embodiment of the invention, of significantly low cost such that it may be termed disposable, is comprised of PVC, PE or similar material and is further comprised of heat sealed, welded or chemically bonded seams. This alternate embodiment of the invention is fabricated using materials and means such as those used in the fabrication of disposable rain ponchos.

The portable, lightweight, low cost nature of the present invention is a significant improvement in the art of golf car covers.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

This invention relates generally to the field of portable soft golf cart covers, specifically to a golf cart cover that easily wraps over a permanent golf cart roof and front windshield. Such a cart cover is easy for a single person to install, remove and prepare for storage. The side walls of the cart cover may be quickly and reliably opened and closed to protect the passengers from wind, rain and cold, while also improving entry and exit convenience.

The primary benefits of the cart cover of the present invention include its overall compactness and extreme portability, which allow the golfer to carry the cover of the invention in his golf club bag, or attached to the exterior of his golf club bag. Enabling the golfer to carry the cover of the invention removes uncertainty as to whether he will have rain protection during play on the course, as the cover of the invention enables the golfer to provide his own rain protection independently of the golf cart owner. While prior art "portable" cart covers generally comprise large storage bags weighing at least 12 to 15 pounds, the preferred embodiment of a cart cover of the present invention is very lightweight (i.e. weighing less than or equal to 1.5 pounds) and is very compact (i.e. in a preferred embodiment its cylindrical storage bag has measurements of less than or equal to a 3 inch radius and a 10 inch height) allowing for easy storage and portability. Given its lightweight and compact nature, a stowed cart cover of the present invention may easily be either clipped or otherwise hung from a user's golf bag (as is common with many other golf accessories) or may easily fit fully within a pocket of a conventional golf bag.

A conventional golf cart C of the prior art is generally shown in FIG. 1, further depicting the wheel well structures WW and the rear frame structure RF of the golf cart C with which components of the present invention will interact.

Figure 7:
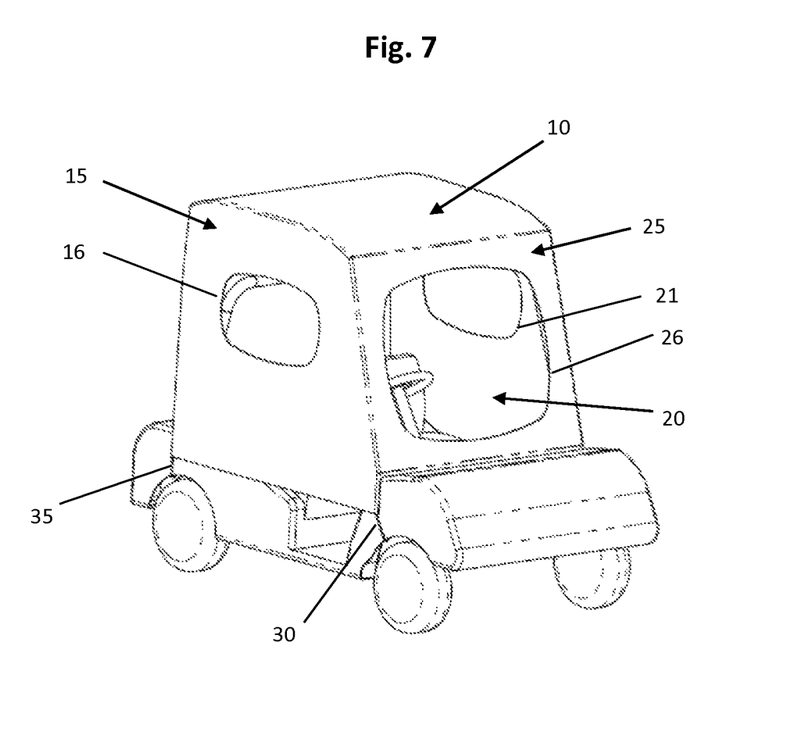
FIG. 7 depicts a front, top perspective view of one embodiment of a portable golf cart cover of the present invention installed on a conventional golf cart.
Figure 8:
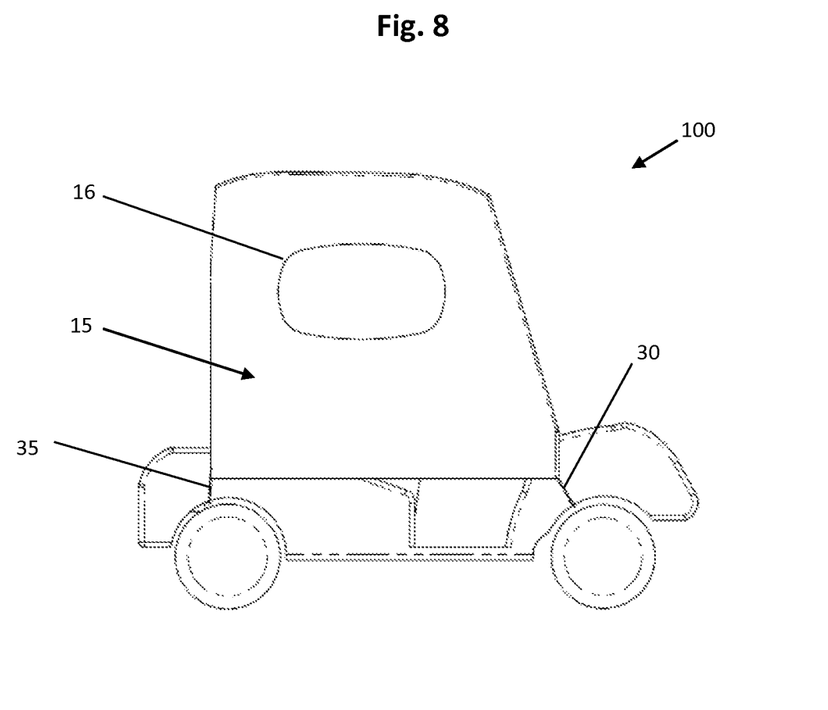
FIG. 8 depicts a right side view of one embodiment of a portable golf cart cover of the present invention installed on a conventional golf cart.
Figure 9:
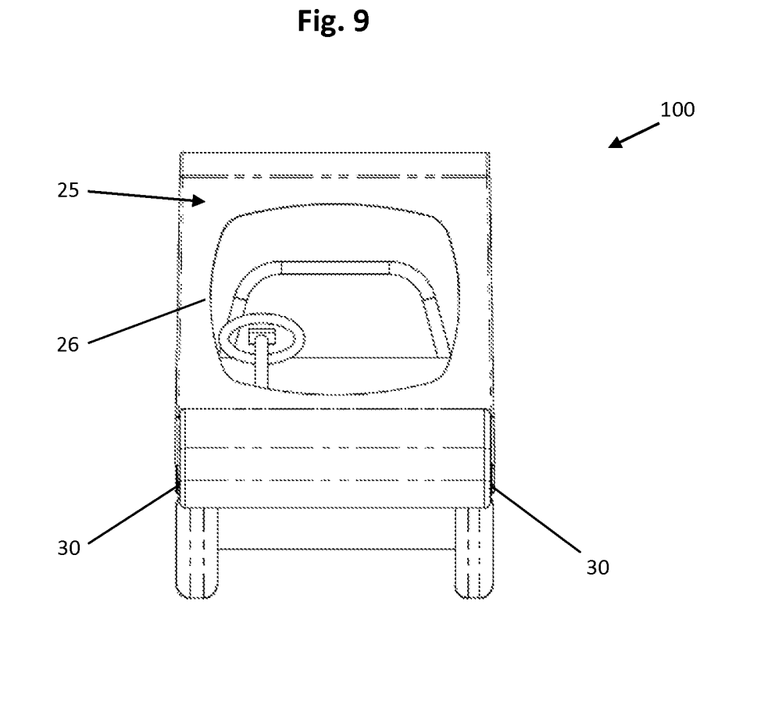
FIG. 9 depicts a front view of one embodiment of a portable golf cart cover of the present invention installed on a conventional golf cart.
Figure 10:
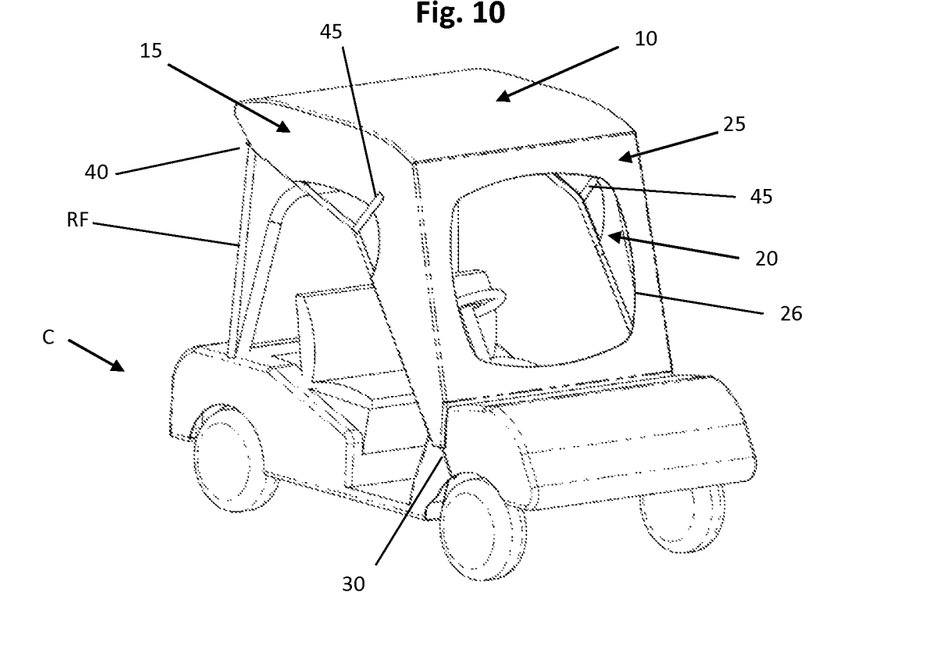
FIG. 10 depicts a front, top perspective view of one embodiment of a portable golf cart cover of the present invention installed on a conventional golf cart.
Figure 11:
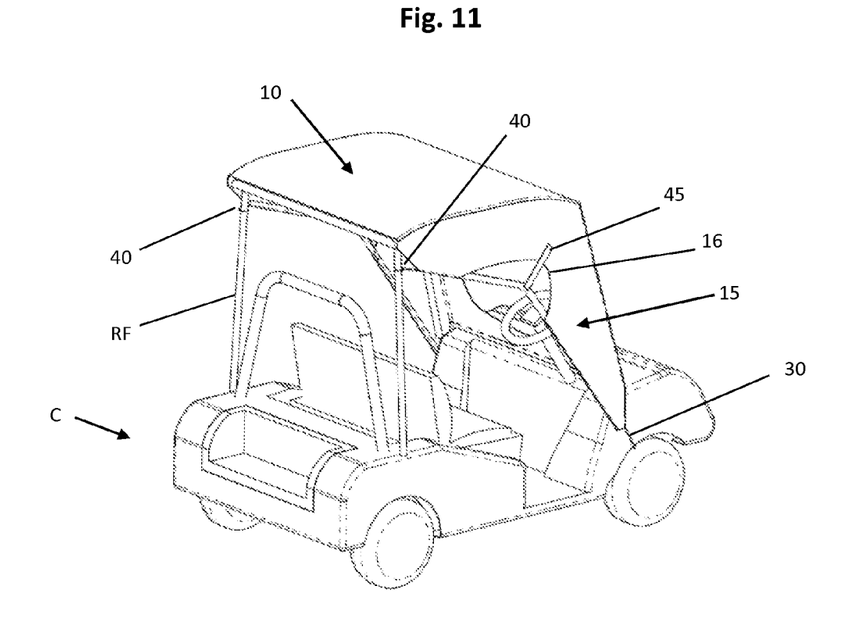
FIG. 11 depicts a rear, top perspective view of one embodiment of a portable golf cart cover of the present invention installed on a conventional golf cart.
Figure 12:
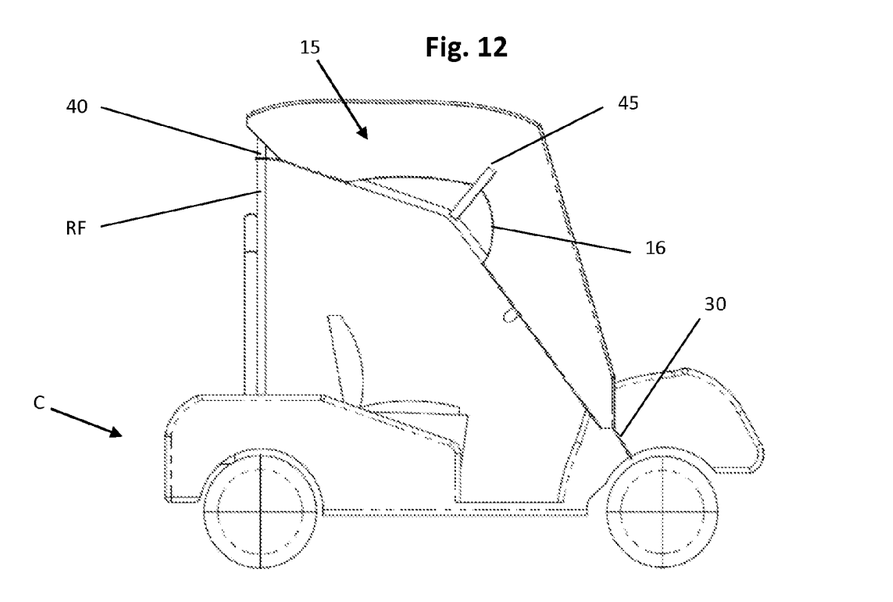
FIG. 12 depicts a right side view of one embodiment of a portable golf cart cover of the present invention installed on a conventional golf cart.

A preferred embodiment of a cart cover 100 of the present invention is illustrated in FIGS. 2-12. FIGS. 2-6 show the cart cover 100 generally, FIGS. 7-9 depict the cart cover 100 installed on a golf cart C in a closed configuration, and FIGS. 10-12 depict the cart cover 100 installed on a golf cart C in an open configuration. The cart cover 100 may comprise a roof panel 10, a right side panel 15, a left side panel 20, and a front panel 25.

The front panel 25 may define a front window fabricated from transparent material 26 that provides visibility for the golf cart C user.

Both the right side panel 15 and left side panel 20 may each respectively further comprise side windows 16 and 21 disposed therein providing lateral and peripheral visibility for golf cart occupants. The front window 26 and side windows 16 and 21 may be constructed from any transparent material known within the art. In a preferred embodiment the front window 26 and side windows 16 and 21 may comprise clear vinyl, most preferred is 8 mil clear vinyl.

Likewise, the cart cover 100 and each of its respective panels (10, 15, 20, and 25) may be manufactured from any materials known within the art including but not limited to nylon, cloth, canvas, tarpaulin, polypropylene, woven polypropylene, polyester coated with urethane, plastic such as polyethylene, plastic film material such as that used, for example, in disposable rain ponchos, such as polyvinylchloride sheet material (PVC) or polyethylene (PE), and the like. In a preferred embodiment, each of the panels (10, 15, 20, and 25) may comprise 1.9 ounces per square yard polyurethane coated nylon rip stop material.

In yet another preferred embodiment, each of the panels (10, 15, 20, and 25) may comprise PVC or PE film, for example having a thickness 0.01 mm to 0.10 mm, and in which the seams are heat sealed, chemically bonded, or attached by other means known in the art. This embodiment of the invention is of such low cost that it can be termed disposable, representing a significant advantage to the golfer due to its significantly low cost.

As shown in FIGS. 2-12, each of the right side panel 15 and the left side panel 20 may comprise one or more lower front attachments 30 for releasably securing the cart cover 100 to the respective front wheel wells WW of a conventional golf cart C. As shown in FIGS. 2-5, 7 and 8, each of the right side panel 15 and left side panel 20 may further comprise one or more lower rear attachments 35 for releasably securing the cart cover 100 to the respective rear wheel wells WW of a conventional golf cart C. The one or more lower front attachments 30 and one or more lower rear attachments 35 combine to provide a secure downforce on the cart cover 100 to prevent movement of the cover 100. As shown in FIGS. 10-12, the one or more upper rear attachments 40 releasably secure the cart cover 100 to at least one rear frame structure RF of the golf cart C. In a preferred embodiment, the one or more upper rear attachments 40 are fixed to each of the right side panel and the left side panel and may be manipulated from inside the golf cart C but another embodiment may include the one or more upper rear attachments 40 fixed instead to the roof panel 10. When the cart cover 100 is installed the front panel 25 helps prevent rearward movement of the cover 100 relative to the golf cart C, and the one or more upper rear attachments 40 may assist by resisting forward movement of the cart cover 100 relative to the golf cart C. As shown in FIGS. 10-12, one or more side panel attachments 45 are capable of releasably securing the right side panel 15 and/or the left side panel 20 in an open configuration allowing or facilitating user access to an interior compartment of the golf cart C. The one or more side panel attachments 45 may be fixed to each of the right side panel 15 and the left side panel 20 respectively (see FIG. 10).

Each of the one or more lower front attachments 30, one or more lower rear attachments 35, one or more upper rear attachments 40, and one or more side panel attachments 45 may comprise any attachment structures known within the art including but not limited to hooks, shock/bungee cords and hooks, tie down straps, straps having hook and loop fasteners, straps having snap fasteners, and the like. Still further, the length of the respective attachments (30, 35, 40, and 45) may be adjustable to assist in providing a universally tight fit for the cart cover 100 to any type or model of golf cart C after a few simple length adjustments are made. Length adjustability may be provided in any manner known within the art including but not limited to buckles, web buckles, web clamps, metal side releases, slides, D-rings, O-rings, Clip and D-rings, ratchets, cam buckles, double bar buckles, snap fasteners, roller adjusters, and the like. In a preferred embodiment, the one or more lower front attachments 30 and one or more lower rear attachments 35 may comprise ⅛ inch shock/bungee cord with an abrasion resistant polyester coating and shock/bungee cord snap hooks. The cart cover 100 may further comprise reinforced anchor points at the location where each of the respective attachments (30, 35, 40. And 45) is in communication with a respective panel (10, 15, 20, and 25) of the cart cover 100. Such anchor reinforcement may help ensure a long lifespan of the cart cover 100 and reduce breakdown or product failure after repeated use and tensioning has been applied via the respective attachments (30, 35, 40, and 45).

Accordingly the reader will see that, according to one embodiment of the invention, the present invention provides for an extremely compact golf cart cover that is much more portable than any other cart covers known within the art. The quick and convenient cart cover of the present invention allows a single person to be able to complete the installation process in less than thirty seconds using at least four wheel well attachment points.

In use, an individual may remove the cart cover 100 from its storage bag when it is desirable to protect the interior compartment of a conventional golf cart C. The cart cover 100 may be positioned over a golf cart C with the roof panel 10 on top of the permanent roof of the golf cart C and the front panel 25 being disposed adjacent the windshield of the golf cart C. Next, the one or more lower front attachments 30 may be releasably secured to the respective front wheel wells WW of the golf cart C, wherein each of the one or more lower front attachments 30 is preferably a shock/bungee cord having a hook at its respective end. Then in a similar fashion, the one or more lower rear attachments 35 may be releasably secured to the respective rear wheel wells WW of the golf cart C, wherein each of the one or more lower rear attachments 35 is preferably a shock/bungee cord having a hook at its respective end. Finally, to further secure the present inventive cart cover 100 to the golf cart C, the one or more upper rear attachments 40 may be releasably secured to a portion of the rear frame RF structure of the golf cart C (preferably by the roof line of the golf cart C) thereby restricting and preventing the cart cover 100 from sliding forward. It may be easiest to attach and/or detach the one or more upper rear attachments 40 from inside the golf cart C.

With the cart cover 100 installed on the golf cart C, the interior compartment is protected from any undesirable external elements such as rain and wind. As shown in FIGS. 10-12, each of the respective side panels 15 and 20 may be rolled or folded up to facilitate a user's entrance and exit from the golf cart C. The one or more lower rear attachments 35 may be easily released or disengaged from the golf cart C by an individual who is located either inside or outside of the golf cart C. Once the lower rear attachment 35 is released, the lower rear corner of the respective side panel 15 and 20 may then be maintained in rolled up or folded position for as long as needed. In one embodiment, the lower rear attachment 35 may be relocated to a position on the upper front of the frame of the golf cart C to releasably hold the side panel 15 and 20 in an open position. In another embodiment, one or more side panel attachments 45 may be used to releasably hold the rolled or folded side panel 15/20 in an open position.

The cart cover of the present invention further provides for a number of marketing and/or advertising advantages. When the cart cover is stowed in its storage bag, the outer surface of the storage bag may comprise any customized indicia disposed thereon. While such indicia may not be viewable when the cart cover storage bag is stowed in a pocket of a golf bag, advertising potential dramatically increases if the storage bag is clipped or otherwise hung on the outside of an individual's golf bag for others to see. Likewise, when in use on a golf cart C the installed cart cover 100 provides more than ample surface area on which any customized advertising or marketing indicia may be disposed. Such indicia on the storage bag and/or the respective panels of the cart cover 100 may be employed by any means known within the art including but not limited to screen printing, silk screening, the sewing of labels and patches, and the like. Such advertising may enable the realization of a revenue stream from advertisements placed on the cover, on the bag, or both.

Figure 13:
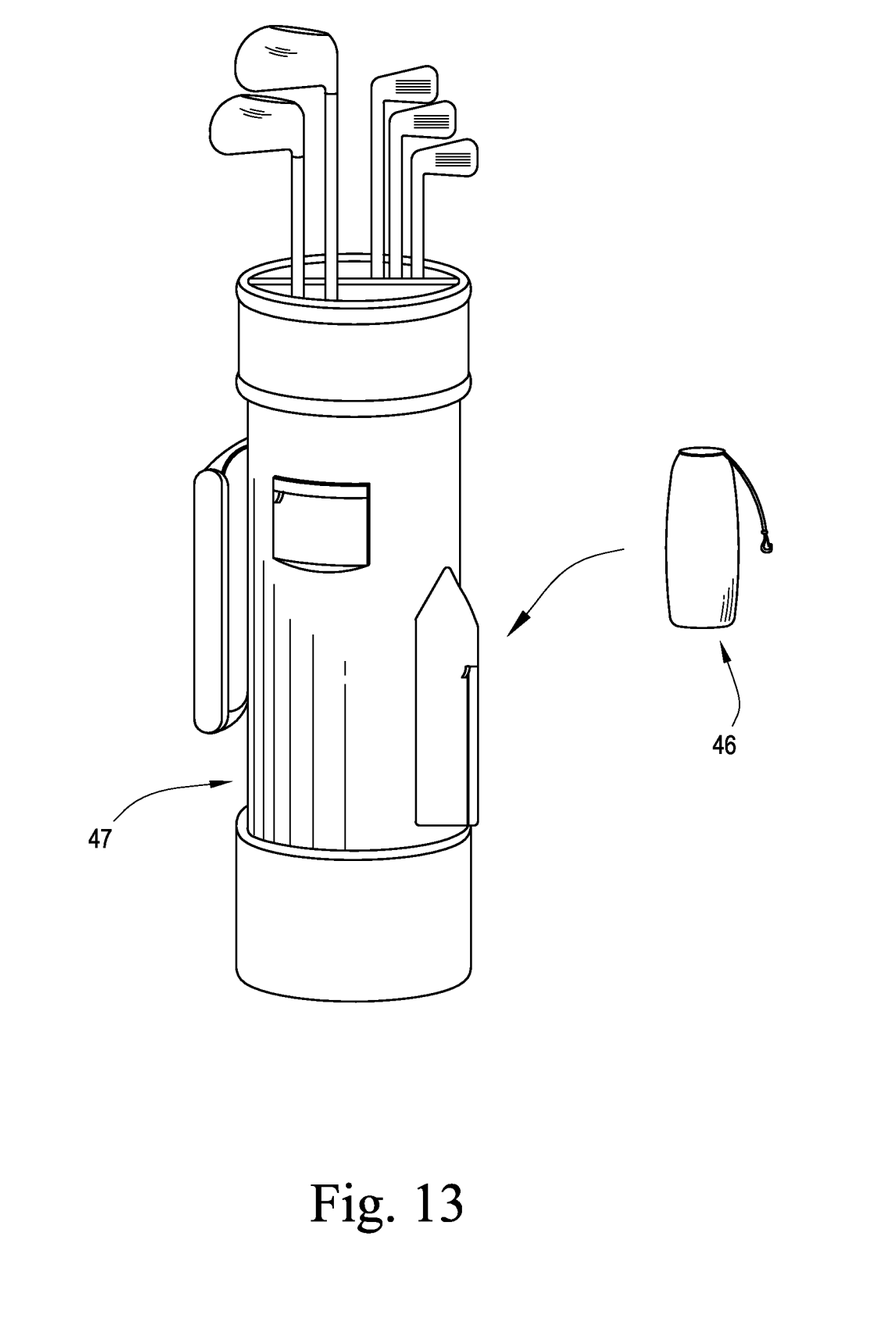
FIG. 13 depicts a view of the golf cart cover stored in its storage bag and placed within a pocket of a golf club bag.

Referring now to FIG. 13, the golf cart cover of the present invention may be stored in a storage bag 46 and placed within a pocket of a golf bag 47. It can easily be appreciated that the cover is therefore not a hindrance to the golfer because it is stored away in a pocket of the golf bag, but it is readily available and easily deployed in the event of threatening inclement weather. Furthermore, it is easily appreciated that the small size of the cover of the present invention enables a golfer to provide his own rain protection independent of the cart owner, thereby eliminating the risk that the golfer will be caught on the golf course without rain protection.

While the above description contains much specificity, these should not be construed as limitations on the scope of any embodiment, but as exemplifications of the presently preferred embodiments thereof. Many other ramifications and variations are possible within the teachings of the various embodiments.

Thus the scope of the invention should be determined by the appended claims and their legal equivalents, and not by the examples given.

What is claimed is:

1. A cover for a golf cart having wheel well structures having a top surface, comprising:
    a roof panel;
    a right side panel attached to said roof panel wherein said right side panel extends downward from said roof panel, and wherein said right side panel does not extend below a top surface of said golf cart wheel well structures;
    a left side panel attached to said roof panel wherein said left side panel extends downward from said roof panel, and wherein said left side panel does not extend below a top surface of said golf cart wheel well structures;
    a front panel attached to each of said roof panel, said right side panel, and said left side panel, and wherein said front panel further comprises a window constructed from a transparent material;
    one or more lower front attachments capable of releasably securing said golf cart cover to one or more front wheel wells of a golf cart, said one or more lower front attachments being fixed to each of said right side panel and said left side panel; and
    one or more lower rear attachments capable of releasably securing said golf cart cover to one or more rear wheel wells of said golf cart, said one or more lower rear attachments are fixed to each of said right side panel and said left side panel;
    wherein said roof panel, front panel, right side panel, and left side panel form a four-sided structure comprising an open back; and
    a storage bag for storing said golf cart cover when not in use, said storage bag comprising a cylindrical shape configuration having a radius of 3 inches or less and a height of 10 inches or less.

2. A cover for a golf cart having wheel well structures having a top surface, comprising:
    a roof panel;
    a right side panel attached to said roof panel wherein said right side panel extends downward from said roof panel, and wherein said right side panel does not extend below a top surface of said golf cart wheel well structures;
    a left side panel attached to said roof panel wherein said left side panel extends downward from said roof panel, and wherein said left side panel does not extend below a top surface of said golf cart wheel well structures;
    a front panel attached to each of said roof panel, said right side panel, and said left side panel, and wherein said front panel further comprises a window constructed from a transparent material;
    one or more lower front attachments capable of releasably securing said golf cart cover to one or more front wheel wells of a golf cart, said one or more lower front attachments being fixed to each of said right side panel and said left side panel; and
    one or more lower rear attachments capable of releasably securing said golf cart cover to one or more rear wheel wells of said golf cart, said one or more lower rear attachments are fixed to each of said right side panel and said left side panel;
    wherein said roof panel, front panel, right side panel, and left side panel form a four-sided structure comprising an open back; and
    wherein said golf cart cover weighs 1.5 pounds or less.

3. A cover for a golf cart having wheel well structures having a top surface, comprising:
    a roof panel;
    a right side panel attached to said roof panel wherein said right side panel extends downward from said roof panel, and wherein said right side panel does not extend below a top surface of said golf cart wheel well structures;
    a left side panel attached to said roof panel wherein said left side panel extends downward from said roof panel, and wherein said left side panel does not extend below a top surface of said golf cart wheel well structures;
    a front panel attached to each of said roof panel, said right side panel, and said left side panel, and wherein said front panel further comprises a window constructed from a transparent material;
    one or more lower front attachments capable of releasably securing said golf cart cover to one or more front wheel wells of a golf cart, said one or more lower front attachments being fixed to each of said right side panel and said left side panel; and
    one or more lower rear attachments capable of releasably securing said golf cart cover to one or more rear wheel wells of said golf cart, said one or more lower rear attachments are fixed to each of said right side panel and said left side panel;
    wherein said roof panel, front panel, right side panel, and left side panel form a four-sided structure comprising an open back; and
    wherein said roof panel, said right side panel, said left side panel, and said front panel are fabricated from a material selected from the group consisting of 1.9 ounces per square yard polyurethane coated nylon rip stop material, polyvinylchloride film of greater than 0.03 mm to 0.10 mm thickness, and polyethylene film of 0.01 mm to 0.10 mm thickness, and wherein said transparent material is 8 mil vinyl.

4. A golf cart cover, comprising:
    a roof panel;
    a right side panel attached to said roof panel;
    a left side panel attached to said roof panel, wherein said right side panel and said left side panel each further comprise a side window disposed therein, said side windows being constructed from a transparent material;
    a front panel attached to each of said roof panel, said right side panel, and said left side panel, wherein said front panel further comprises a window constructed from said transparent material;
    one or more lower front attachments capable of releasably securing said golf cart cover to one or more front wheel wells of a golf cart, said one or more lower front attachments are fixed to each of said right side panel and said left side panel;

one or more lower rear attachments capable of releasably securing said golf cart cover to one or more rear wheel wells of said golf cart, said one or more lower rear attachments are fixed to each of said right side panel and said left side panel;

one or more upper rear attachments capable of releasably securing said golf cart cover to at least one rear frame structure of said golf cart, said one or more upper rear attachments are fixed to each of said right side panel and said left side panel;

one or more side panel attachments capable of releasably securing said right side panel or said left side panel in an open configuration allowing access to an interior compartment of said golf cart, said one or more side panel attachments are fixed to each of said right side panel and said left side panel; and a storage bag for storing said golf cart cover when not in use, said storage bag comprising a cylindrical shape configuration having a radius of 3 inches or less and a height of 10 inches or less;

wherein said golf cart cover weighs 1.5 pounds or less;

wherein each of said one or more lower front attachments, said one or more lower rear attachments, said one or more upper rear attachments, and said one or more side panel attachments are independently selected from the group consisting of hooks, shock cords and hooks, tie down straps, straps having hook and loop fasteners, and straps having snap fasteners.

5. The golf cart cover of claim 4, wherein said roof panel, said right side panel, said left side panel, and said front panel are fabricated from a material selected from the group consisting of 1.9 ounces per square yard polyurethane coated nylon rip stop material, polyvinylchloride film of 0.01 mm to 0.10 mm thickness, and polyethylene film of 0.01 mm to 0.10 mm thickness, and wherein said transparent material is 8 mil vinyl.

6. The golf cart cover of claim 4, wherein said one or more lower front attachments and said one or more lower rear attachments each respectively comprise a ⅛ inch shock cord with an abrasion resistant polyester coating and a shock cord snap hook.

* * * * *